May 5, 1942.   C. F. FISHER ET AL   2,281,756
WIRE CUTTING MACHINE
Filed Oct. 22, 1940   3 Sheets-Sheet 1

Witness
Herbert E. Covey

Inventor
Clayton F. Fisher
and Edward E. Franks Jr.
By Clayton L. Jenks
Attorney

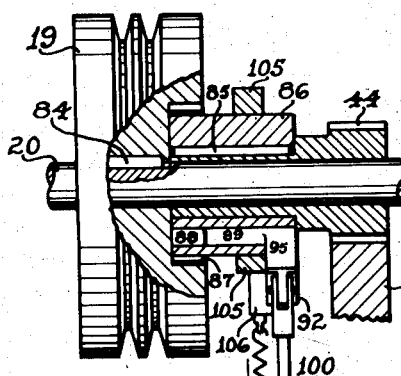
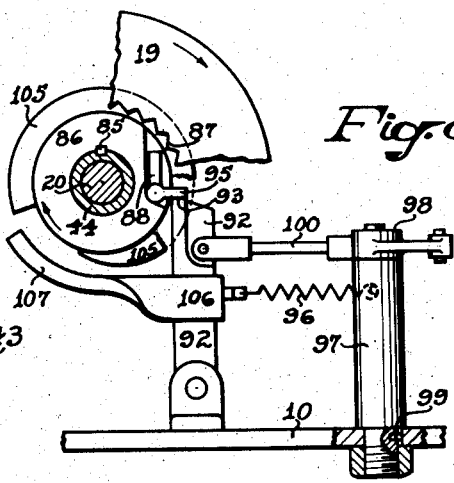
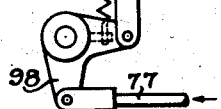
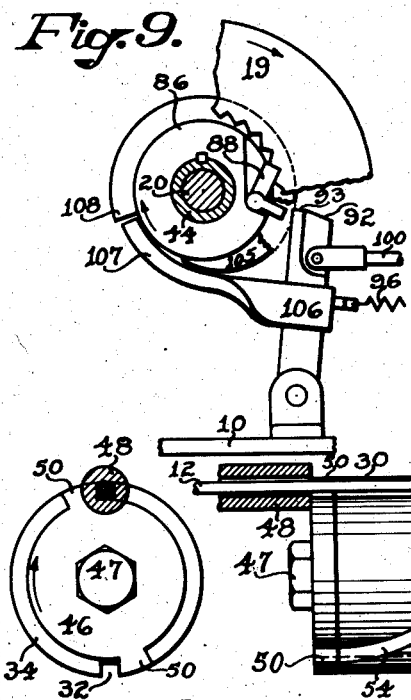
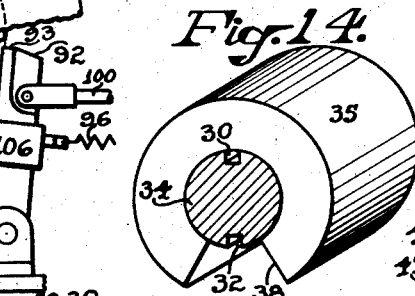

Patented May 5, 1942

2,281,756

UNITED STATES PATENT OFFICE 2,281,756

WIRE CUTTING MACHINE

Clayton F. Fisher, Spencer, and Edward E. Franks, Jr., Worcester, Mass., assignors to Sleeper & Hartley, Inc., Worcester, Mass., a corporation of Massachusetts Application October 22, 1940, Serial No. 362,250

3 Claims. (Cl. 140—140)

This invention relates to a machine for cutting wire and more particularly to a machine which operates automatically and serves to cut the wire into desired lengths.

In accordance with the patent to Sleeper & Horton No. 1,508,753 of September 16, 1924, wire of relatively large diameter may be cut into desired lengths by a cutter which is operated automatically by a clutch controlled mechanism, wherein the forward movement of the wire serves to actuate the clutch. Owing to the inertia of the movable parts and the force required for throwing the clutch, that type of machine has been limited in its use to the relatively large sizes of wire and it has not been sufficiently efficient in its operation to meet the high speed requirements of the modern wire industry.

The primary object of this invention is to overcome such disadvantages and to provide a machine which will operate rapidly and efficiently for the purpose of cutting wires of both fine and coarse sizes into predetermined and uniform lengths. Further objects will be apparent in the following disclosure.

In accordance with this invention, wire is fed continuously into the cutting machine in such a manner that when the advancing end of the wire has reached a predetermined position, it trips or releases a loaded trigger mechanism which in turn causes a clutch to be operated automatically to force a power driven cutter to sever the wire at a predetermined point, whereupon the newly advancing end of the wire again travels forward to repeat the operation while the trigger and clutch mechanisms are set for a repetition of the cycle.

Referring to the drawings which illustrate a preferred embodiment of this invention:

Fig. 7 is a plan view, partly in section, of the clutch and the associated driving and actuating mechanism;

Fig. 8 is an elevation of the clutch shown in Fig. 7, with the parts at rest;

Fig. 9 is a view similar to Fig. 8, with the clutch parts engaged for actuating the cutter mechanism;

Fig. 10 is a similar view, showing the clutch parts as they are operating and just prior to disengagement thereof;

Fig. 11 is a fragmentary detail, partly broken away, showing the left hand portion of the cutter shaft;

Fig. 12 is an end view of the shaft shown in Fig. 13;

Fig. 13 is a view similar to Fig. 11 with the shaft rotated through 90 degrees and showing the cooperating cutter tube;

Fig. 14 is a fragmentary end view of one of the bearings with the cutter shaft assembled therein and showing how the wire is dropped from the machine.

Figure 1:
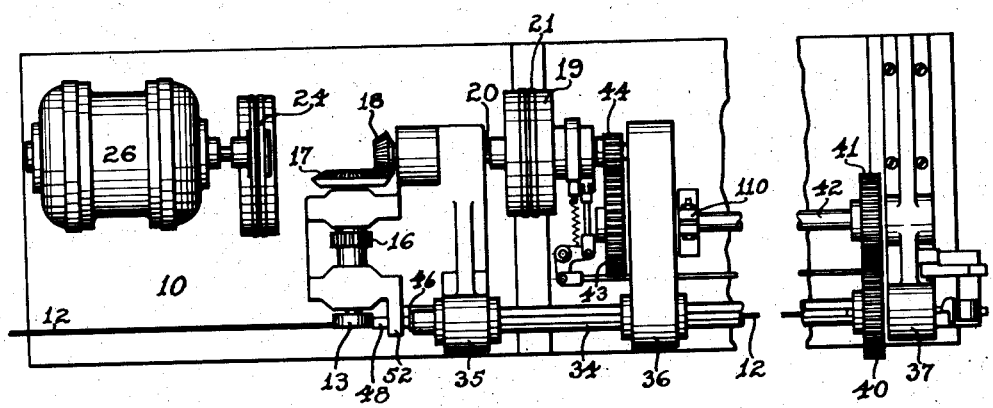
Fig. 1 is a top plan view of the machine, partly broken away.
Figure 2:
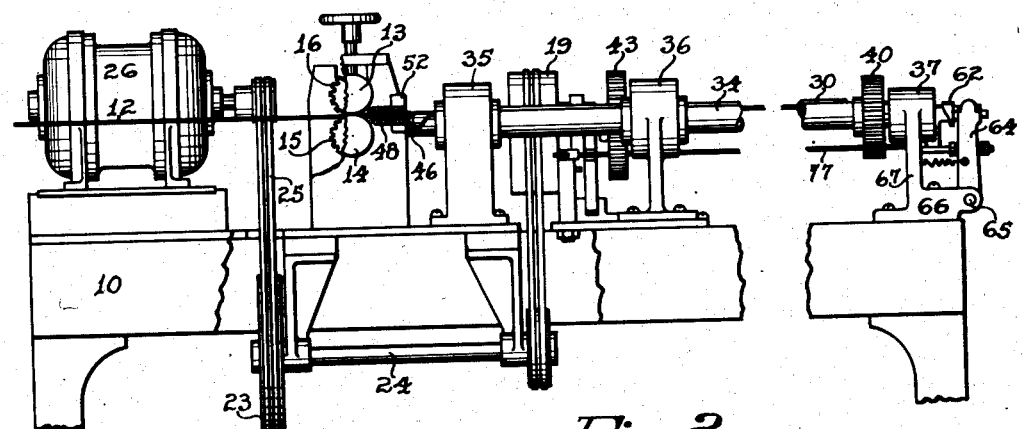
Fig. 2 is a front elevation of the machine of Fig. 1.

As shown in Figs. 1 and 2, the machine comprises a suitable table 10 on which the mechanism is mounted. The wire 12 is fed through the machine by a pair of driven feed rollers 13 and 14 suitably mounted on a shaft driven by a pair of spur gears 15 and 16 which are in turn driven continuously by a pair of beveled gears 17 and 18 suitably mounted on the table. The gear 18 is driven by a pulley 19 keyed to the other end of the shaft 20 which carries the gear 18. This pulley is in turn driven by a belt 21 through a pair of pulleys 22 and 23 carried on a short shaft 24 and the pulley 23 is driven by a belt 25 operated by an electric motor 26 or any other suitable source of power.

The wire thus fed forward by these feeding rolls is forced forward into one of two grooves 30 and 32 (see Figs. 2, 3, 11 and 13) which are arranged at 180° apart and parallel with the shaft axis in a diametrical plane on opposite portions of a cutter shaft 34. This cutter shaft is a little longer than the longest length of the wire to be cut. It is mounted for rotation in several bearings, of which three are shown in drawings. These bearings 35, 36 and 37, are suitably mounted on the table 10. The bearings are removably mounted on the table and so arranged that any suitable number of them may be employed. depending upon the length of the cutter shaft used which may be varied to give the required length of wire to be cut. The intermediate bearing supports insure that the cutter shaft is held in a proper axial position and will not bend during its operation. The right hand bearing 37 is of standard construction, while the bearings 35 and 36 are made as shown in Fig. 14, in that these two bearings are provided with an enlarged tapered slot 38 in its bottom portion, and the standards and other machine parts are so arranged that the wire which has been projected into the upper long slot 30 may be ultimately revolved to the lowermost position 32 where it will fall out of the lower groove through the open slot 38.

The cutter shaft 34 is arranged to be held stationary during most of the time in which the advancing wire 12 is fed lengthwise of the groove 30 in the top of the cutter shaft. When the wire has reached the limit of its travel at the right hand end of that cutter shaft, it operates the trigger mechanism and causes the clutch to rotate the shaft and cut the wire and then carry the cut wire into the lowermost position of Fig. 14 so that it may drop from the machine. To effect this rotation of the cutter shaft, a gear 40 (Fig. 1) is keyed to the shaft 34 and located near the bearing 37. This gear meshes with a gear 41 keyed to a shaft 42 which has a gear 43 keyed on its left hand end. That gear 43 is adapted to be operated by the small gear 44 which is driven by the clutch mechanism. The gears 44 and 43 have a two to one reduction ratio, so that the clutch shaft will make a complete revolution while the cutter shaft rotates through only 180°.

The device which serves to cut the wire is made up of two parts, one of which is a disk shaped cutter plate 46 mounted on the left hand end of the cutter shaft 34 by means of a set screw 47 (Fig. 11) and the other is the cutter tube 48 (Fig. 1) through which the wire is fed to the cutter shaft (Figs. 2 and 13). The cutter tube 48 has a cylindrical inner surface slightly larger than the wire, and its end forms a plane which is parallel with and close to the plane side of the cutter disk 46. The cutter disk 46 has a diameter equal to the distance between the two slots 30 and 32, and it is provided with two opposed cutters 50 projecting outwardly from the circumference of the disk to a point beyond the wire held in the groove 30 or to the circumference of the cutter shaft 34. Hence, by rotating the cutter disk, the sharp forward edge of the knife 50 will sever the wire which is held by the tube 48. The latter is suitably supported in a projecting portion 52 of the casting which carries the feed rolls and associated driving mechanism.

Since the wire is fed at a continuous rate and the cutter shaft is rotated during a part of this feeding time, provision is made, as shown in Figs. 11 and 13, for introducing the advancing newly cut end of the wire into the upper groove 30 while the cutter shaft is rotating. That is, each of the grooves 30 and 32 terminates in an enlarged portion having a scroll shaped or helical wall 54. The bottom cylindrical surface 55 of this enlarged end of the groove lies at the same radial distance from the center of the shaft as is the bottom of the groove. The helical wall 54 extends substantially half way around the shaft, so that as soon as the wire in the shaft slot 30 has been cut by the rotation of the shaft, the advancing end of the wire will feed forward into the wide space formed by the helical wall 54 and the radial wall 56 which is a continuation of one side of the slot 30 or 32. The end of the wire thus advances in this open space and is fed by the helical wall 54 into the narrow portion of the groove 30 by the time that the cutter shaft has made its 180° turn. It will be understood that the groove in the lower position 32 revolves to the upper position at each half turn of the shaft 34 and that the wire is always fed into the upper passage 30.

Figure 3:
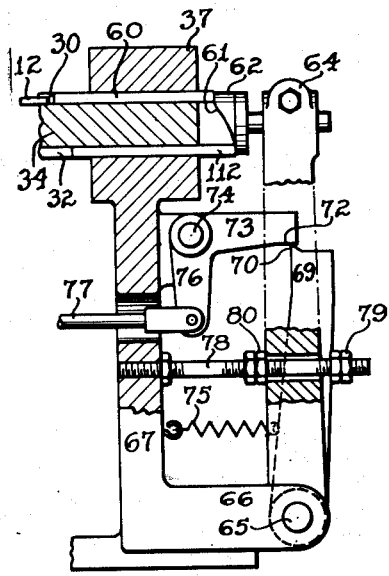
Fig. 3 is an elevational detail, partly in section, of the clutch controlling trigger mechanism which has its parts at rest and set for actuation by the advancing wire.
Figure 4:
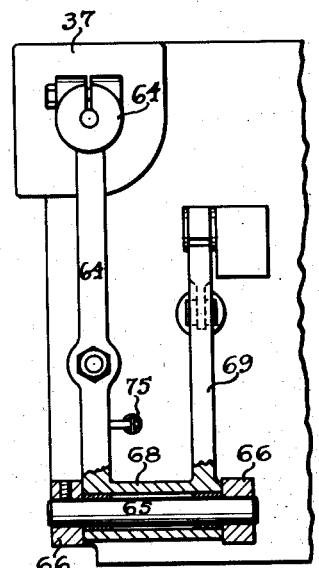
Fig. 4 is an end view of the parts shown in Fig. 3.

A primary feature of this invention involves an automatically actuated clutch operating mechanism and the releasable loaded tripping device which controls the clutch for rotating the cutter shaft. As shown in Fig. 3, the end of the wire 12 in the slot 30 strikes a short rod 60 which slides freely in the right hand end of that slot. This rod 60 may be replaced by other rods of different lengths, so that different lengths of the wire may be cut. The rod 60, when struck by the advancing end of the wire, slides forward in the groove 30 and strikes the cam face 61 of the member 62 which is fixed near the top end of the swinging arm 64. This arm 64 is pivoted on the pin 65 (Fig. 4) carried in a pair of lugs 66 of the casting 67 (Figs. 2, 3 and 4) which carries the right hand bearing 37. The arm 64 is integral with a sleeve 68 which carries a further arm 69 so that the arms 64 and 69 swing as a unit. The top end of the arm 69 terminates in a knife edge 70 which, in its inoperative position, is caught under the lower surface 72 of a bell crank 73 pivoted on a pin 74 suitably mounted on the side of the casting 67. The arm 69 is normally held in that engaged position by the spring 75 which is connected to the rocking arm and the casting 67, as shown in Fig. 3, but it is moved towards the right by the wire pushing the rod 60. The lower arm 76 of the bell crank is pivotedly connected with rod 77 which serves to control the clutch. The swinging motion of these two arms 64 and 69 is controlled by a bolt 78 screw threaded into the casting 67 and carrying two pairs of adjustable nuts 79 and 80. These nuts are adjusted so as to permit the arms to swing only enough to move the knife edge 70 from contact with the bell crank lever or permit it to be caught just under that lever near its end so that only a very slight movement of the arm 69 is required to release the clutch actuating mechanism. This distance of movement of the arm is taken into account in determining the length of the wire that is cut off.

Figure 15:
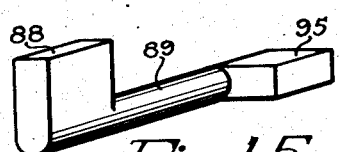
Fig. 15 is a perspective view of the clutch key.

The clutch may be of the general type shown in said prior patent, but it preferably is so constructed as to minimize the lost motion in its operation and provide a greater speed and accuracy of the cutting operation. As shown in particular in Figs. 7 and 8, the V-belt pulley 19 is secured to the shaft 20 which carries the beveled gear 18 by means of a key 84. The gear 44 is freely rotatable on this shaft 20 and it is secured to a clutch body 86 by a key 85. The left hand end of the clutch body 86 projects into a recess in the pulley 19. The pulley 19 has a series of teeth 87 cut on the internal surface of that recess. These teeth are adapted to be engaged by the finger 88 of a rocking key, which is shaped as shown in Fig. 15. The central cylindrical portion 89 of this key fits into a suitably shaped groove in the clutch body 86; and the parts are so arranged that the clutch key may swing freely for the desired purposes, but it is held in position in the clutch body 86 so that when the finger 88 of the key engages the teeth 87 of the pulley 19, the clutch body will be forced to rotate with the pulley. This occurs when the parts are in the positions shown in Figs. 9 and 10. The finger 88 of the clutch key is pulled out of locking engagement with the teeth 87 by a swinging arm 92 suitably pivoted on the table 10. The upper left hand edge 93 of the arm 92 is caught under the finger 95 of the locking key when the clutch is at rest and thereby holds the finger 88 disengaged from the teeth 87.

When the trigger mechanism is released by the end of the wire 12, the rod 77 is permitted to be drawn toward the left by means of a spring 96 (Fig. 8) suitably secured at one end to a fixed stand 97 projecting upwardly from the table. The rod 77 is connected to the swinging arm 92 through the bell crank 98 which is pivoted on the fixed stand 97, the latter being keyed to the table 10 by key 99 so that it will not rotate. The bell crank 98 is connected through a short rod 100 to the swinging arm 92, and the spring 96 is connected to the bell crank so as to swing the arm 92 towards the right in Fig. 8. These connecting rods may be threaded and suitably adjusted to avoid lost motion and to provide for efficient operation of the clutch.

Insofar as described, it will be seen that when the trigger has been released, the spring 96 will pull the arm 92 toward the right and remove it from contact with the finger 95 of the rocking clutch key. The out of balance condition of the clutch key causes the finger 95 to drop and move the other finger 88 forward, where it will engage one of the revolving teeth 87 of the pulley and thus connect the clutch parts and cause gear 44 to rotate and thus drive the cutter shaft 34 and cut the wire.

The disconnection of the clutch is accomplished by means of a cam mechanism. This comprises a spiral cam 105 attached to rotate with the clutch body 86. This cam is tapered in the direction of its rotation, as shown by the arrow in Fig. 8. The rocking arm 92 carries an arm 106 secured thereon, which has an upwardly extending arcuate portion 107 located close to the periphery of the cam 105. When the clutch parts are engaged and the arm 92 is in its right hand position, as shown in Fig. 9, the arm 107 lies in the path of the advancing nose of the cam 105. Consequently, the cam thrusts the arm 107 downwardly and thus gradually rocks the arm 92 toward the left. By the time the thick end 108 of the cam has reached the arcuate arm 107, the lever 92 has been pulled forward into the position shown in Fig. 10, in which it lies directly in the path of the finger 95 of the clutch key, which has in the meantime been revolving through substantially a full turn with the pulley. When the finger 95 strikes the top of this rocking arm 92, it knocks the key finger 88 out of engagement with one of the teeth 87 and thus leaves the pulley free to revolve without carrying the inner clutch body with it. A friction brake 110 (Fig. 1) may be used to stop the cutter shaft. This may comprise a band frictionally dragging against a cylindrical surface on the shaft 42.

Figure 5:
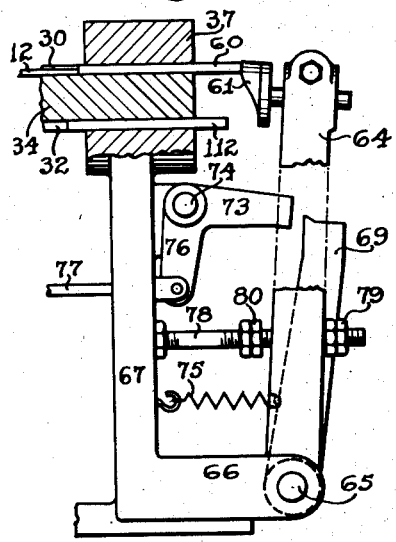
Fig. 5 is a view similar to Fig. 3, but in which the wire has tripped the mechanism for the purpose of actuating the clutch.
Figure 6:
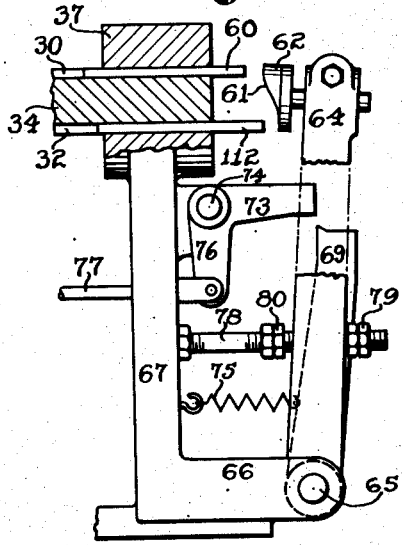
Fig. 6 is a similar view showing the positions of the parts after the cut length of wire has been dropped from the machine, and the trigger parts are in intermediate positions in their return to the set condition of Fig. 3.

In the operation of the machine, the wire is fed forward into the top groove 30 until it strikes the sliding rod 60 (Fig. 3). This shoves the rocking arm 64 to the right and releases the knife edge 70 from contact with the bell crank 73 and permits the spring 96 to pull the rod 77 forward. This causes the bell crank lever 73 to drop into the position shown in Fig. 5. That movement of the rod 77 permits the swinging knock-out arm 92 to move to the right and thus permit the out of balance clutch key to tip toward the right and engage the teeth 87 of the pulley. Consequently the gear 44 is rotated and this turns the cutter shaft 34 and causes the cutter knife 50 to cut the wire. The cutter shaft keeps on revolving through 180° and when the upper slot has now reached the lowermost position 32, the cut piece of wire drops out. In the meantime, the clutch body has been making a full revolution while the cutter shaft revolves only a half turn. Hence, by the time the upper slot 30 has reached the lowermost position, the clutch is now disengaged by the action of the cam 105 which returns the arm 92 to a position where it knocks out the clutch finger. The advancing wire, in the meantime is feeding forward against the helical wall 54 into the upper slot 30 and it travels rapidly toward the right hand end of the machine, so that the cycle may be again repeated. When the cutter shaft 34 revolves to move the wire slot 30 to the lowermost position 32, the sliding rod 60 of Fig. 3, which has previously moved the swinging arm 64 to the position of Fig. 5 revolves within the bearing 37 to the lower position 112 of Fig. 6. The end of the sliding rod 60 lies in the same vertical plane of its position in Fig. 5. When the spring 75 returns the swinging lever 64 to the position of Fig. 3, the lower portion of the cam face 61 engages the rod. Then when the shaft 34 revolves a second time, the rod 60 is shoved back towards the left to the position of Fig. 3 by engagement with the cam 61. Hence, each one of these rods 60 acts alternately as a trip for cutting every other piece of wire.

The machine may serve to cut any length of wire by substituting different lengths of cutter shaft and by using different lengths of the sliding rod 60. The number of intermediate bearings 36 will depend on the length of the shaft. The bearing 37 and all of the associated trigger mechanism may be removed and adjusted to any desired position by means of suitable fastening bolts located in any of a series of holes in the table 10.

It will now be appreciated that many modifications may be made in the construction within the scope of this invention and that the drawings and the above description are to be interpreted as illustrating the general principles and a preferred embodiment of the invention and not as limiting the claims appended hereto.

We claim:

1. A wire cutting machine comprising means for feeding the wire forward, a rotatable cutter shaft having an open sided passage into which the wire may be fed, means associated with said cutter shaft for severing the wire when the shaft rotates, said shaft being so arranged that the wire may drop out of said passage when the shaft rotates, power operated mechanism for rotating the shaft, a clutch controlling said mechanism, a loaded trigger mechanism which serves automatically to connect the clutch and cause the wire to be severed, means whereby the trigger mechanism is released by the forward motion of the wire to a given position, and means actuated by the power mechanism during the rotation of the shaft which sets the trigger mechanism and disconnects the clutch.

2. A wire cutting machine comprising a rotatable cutter shaft having an open sided passage into which the wire may be fed, a cutter associated therewith for cutting the wire when the shaft is rotated, means for feeding the wire into the passage, a power operated mechanism to rotate the shaft, a clutch arranged to be actuated intermittently for controlling said mechanism, a spring loaded releasable trigger mechanism actuated by the forward movement of the wire to be cut which connects the clutch and causes the wire to be severed, and means actuated by the power mechanism which resets said trigger mechanism and disconnects the clutch.

3. A wire cutting machine comprising a rotatable cutter having diametrically opposed open sided grooves, means for feeding wire continuously forward into a groove, means associated with the rotatable shaft for cutting the wire when shaft is rotated, power mechanism for rotating the shaft, a clutch controlling said mechanism, a spring loaded trigger mechanism arranged to connect the clutch which is releasable by the forward movement of the wire to a predetermined position, and means whereby the trigger mechanism is reloaded and the clutch is disconnected when the cutter shaft has rotated through a half turn, said shaft and associated parts being so constructed and arranged that the wire may be continuously fed forward first into one groove and then the other and whereby the severed wire may be dropped from the cutter shaft when it rotates.

CLAYTON F. FISHER.
EDWARD E. FRANKS, JR.